(12) United States Patent
Falloon et al.

(10) Patent No.: US 8,129,457 B2
(45) Date of Patent: Mar. 6, 2012

(54) FLAME RETARDANT BLENDS FOR FLEXIBLE POLYURETHANE FOAM

(75) Inventors: Stephen B. Falloon, Lafayette, IN (US); Matthew D. Phillips, Camden, IN (US)

(73) Assignee: Chemtura Corporation, Middlebury, CT (US)

( * ) Notice: Subject to any disclaimer, the term of this patent is extended or adjusted under 35 U.S.C. 154(b) by 428 days.

(21) Appl. No.: 11/723,539

(22) Filed: Mar. 20, 2007

(65) Prior Publication Data

US 2007/0221892 A1 Sep. 27, 2007

Related U.S. Application Data

(60) Provisional application No. 60/785,002, filed on Mar. 22, 2006.

(51) Int. Cl.
*C08K 5/52* (2006.01)

(52) U.S. Cl. .......... 524/141; 521/99; 521/106; 521/155; 524/107

(58) Field of Classification Search .................... 524/161
See application file for complete search history.

(56) References Cited

U.S. PATENT DOCUMENTS

| | | | |
|---|---|---|---|
| 4,246,360 A | 1/1981 | Brown et al. | |
| 4,273,881 A | 6/1981 | Otten | |
| 4,407,981 A | 10/1983 | Aaronson | |
| 4,565,833 A | 1/1986 | Buszard et al. | |
| 4,649,163 A | 3/1987 | Tairaka | |
| 4,696,952 A | 9/1987 | Shimomura et al. | |
| 4,746,682 A * | 5/1988 | Green | 521/107 |
| 4,751,252 A | 6/1988 | Clatty | |
| 4,880,844 A | 11/1989 | Fesman | |
| 4,892,683 A | 1/1990 | Naseem | |
| 4,892,892 A | 1/1990 | Favstritsky et al. | |
| 4,910,241 A | 3/1990 | Abolins et al. | |
| 4,954,542 A | 9/1990 | Bohen et al. | |
| 5,036,121 A | 7/1991 | Coaker et al. | |
| 5,164,417 A | 11/1992 | Anderson | |
| 5,328,627 A | 7/1994 | Bohen et al. | |
| 5,578,651 A | 11/1996 | Lamberts et al. | |
| 5,672,645 A | 9/1997 | Eckel et al. | |
| 5,728,746 A | 3/1998 | Sicken | |
| 5,728,760 A | 3/1998 | Rose et al. | 524/292 |
| 5,958,993 A | 9/1999 | Blundell et al. | |
| 6,054,499 A | 4/2000 | Pauls et al. | |
| 7,008,973 B2 * | 3/2006 | Falloon et al. | 521/106 |
| 7,307,183 B2 | 12/2007 | Bartley et al. | |
| 7,423,069 B2 | 9/2008 | Buszard et al. | |
| 2003/0078325 A1 | 4/2003 | Rose et al. | |
| 2003/0216484 A1 * | 11/2003 | Phillips et al. | 521/50 |
| 2004/0030011 A1 | 2/2004 | Buszard et al. | |
| 2004/0171709 A1 * | 9/2004 | Falloon et al. | 521/99 |
| 2006/0063867 A1 * | 3/2006 | Durairaj et al. | 524/115 |
| 2006/0122285 A1 | 6/2006 | Falloon et al. | |
| 2007/0221892 A1 | 9/2007 | Falloon et al. | |

FOREIGN PATENT DOCUMENTS

| | | |
|---|---|---|
| EP | 0005903 B1 | 6/1983 |
| EP | 0308733 B1 | 1/1992 |
| EP | 0884340 A1 | 12/1998 |
| EP | 0428221 B1 | 10/2000 |
| FR | 1383869 A | 1/1965 |
| GB | 1146173 A | 3/1969 |
| GB | 2011449 A | 7/1979 |
| JP | 10147708 A | 6/1998 |
| WO | 89/03854 A1 | 5/1989 |
| WO | 96/35744 A1 | 11/1996 |
| WO | 98/57920 A2 | 12/1998 |
| WO | 98/57920 A3 | 12/1998 |
| WO | 99/31173 A1 | 6/1999 |
| WO | 01/18088 A1 | 3/2001 |
| WO | 03/064361 A1 | 8/2003 |
| WO | WO 03/099919 A1 | 12/2003 |
| WO | WO 2005/118699 A | 12/2005 |

* cited by examiner

*Primary Examiner* — Doris Lee
(74) *Attorney, Agent, or Firm* — Joseph Suhadolnik

(57) ABSTRACT

A composition is disclosed that comprises an otherwise flammable flexible polyurethane foam and a multi-component flame retardant additive. The flame retardant additive includes an alkyl substituted aryl phosphate and an alkyl phosphate ester wherein the alkyl groups range from $C_4$ to $C_{20}$ and contain one to six oxygen atoms in the alkyl chain. Optionally, the flame retardant additive includes a halogenated flame retardant containing more than 30 wt. percent of bromine, chlorine, or a mixture thereof.

11 Claims, No Drawings

FLAME RETARDANT BLENDS FOR FLEXIBLE POLYURETHANE FOAM

PRIORITY

We claim the benefit under Title 35, United States Code, §119 of U.S. Provisional Application No. 60/785,002, filed Mar. 22, 2006, entitled FLAME RETARDANT COMPOSITION FOR USE IN STYRENICS.

BACKGROUND OF THE INVENTION

1. Field of the Invention

The invention relates to flame retardants for use in flexible polyurethane foam composition and a method of flame retarding flexible polyurethane foam. Specifically, the invention relates to a composition comprising flammable flexible polyurethane foam and a multi-component flame retardant additive.

2. Description of Related Art

The flexible polyurethane foams of the invention are well known in the [chemical] industry. Information on preparation and common reactants can be found in many resources, including the ENCYCLOPEDIA OF POLYMER SCIENCE AND ENGINEERING, Vol. 13 (John Wiley & Sons, Inc., 1988).

Flexible polyurethane foam producers desire to produce foam that meets flammability standards with higher fire safety requirements when used in furniture applications. California has proposed increasing the flammability criteria in the form of Bulletin 117. The U.S. Congress and Consumer Product Safety Commission are moving toward a national fire safety standard for upholstered furniture.

Flame retardants based upon pentabromodiphenyl oxide (PBDE) and alkylated triaryl phosphates have traditionally been used to meet the fire safety requirements. Recently pentabromodiphenyl oxide has come under attack owning to concerns about its impact on the environment. Consequently "PBDE free" flame retardants have been used in greater volumes and have been promoted as more environmentally sound alternatives.

U.S. Pat. No. 4,746,682 discloses a liquid composition for use as a flame retardant additive for polyurethane foams, the process of preparing the flame retarded polyurethane foam and the foam itself. The liquid composition is an additive for a polyurethane foam comprising polybrominated diphenyl oxide and an alkylated triaryl phosphate ester, the brominated diphenyl oxide and triaryl phosphate being provided in sufficient quantity to provide between 0.7 and 4 parts by weight bromine per part by weight of triaryl phosphate.

U.S. Pat. No. 5,728,760 discloses a method of making flame retarded polyurethanes by including a bromobenzoate compound in a polyurethane mixture and a method of making flame retarded polyvinyl chlorides, unsaturated polyesters and epoxy resins by incorporating a bromobenzoate compound into the polymer system. The bromobenzoate compounds may also be used as plasticizers for PVC and rubber. "PBDE free" flame retardants as described in U.S. Pat. No. 5,728,760, known as Firemaster 550, a product of Great Lakes Chemical Corporation, now known as Chemtura Corporation, is a blend of a tetrabromobenzoate and an isopropylated triaryl phosphate. However, Firemaster 550 typically has to be used at levels approximately 5% higher than the PBDE based flame retardants in low density foams (1.2 pound per cubic foot (p.c.f.)). This increase in flame retardant load level increases the cost to produce the resulting polyurethane foam.

The industry lacks a flame retardant system that meets the more stringent flammability requirements and has similar or improved efficiency as compared to the traditional PBDE based flame retardants.

SUMMARY OF THE INVENTION

The present invention relates to a composition comprising flammable flexible polyurethane foam and a multi-component flame retardant additive and a method of flame retarding the flexible polyurethane foam. The invention meets the more stringent flammability requirements and has similar or improved efficiency as compared to the traditional PBDE based flame retardants.

The invention includes a flame retardant composition. The composition uses a flexible polyurethane foam. An alkyl substituted aryl phosphate represented by the general structure

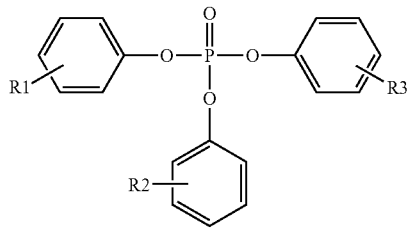

is used wherein $R_1$, $R_2$, and $R_3$ are independently either hydrogen or a linear or branched $C_1$ to $C_6$ alkyl group. Flame retardant additives are used that include an alkyl phosphate ester wherein the alkyl groups range from $C_4$ to $C_{20}$ and contain one to six oxygen atoms in the alkyl chain.

More particularly, the present invention is directed to a composition comprising otherwise flammable flexible polyurethane foam and a multi-component flame retardant additive which comprises at least three components. Component A is an alkyl substituted aryl phosphate, component B is a halogenated flame retardant containing more than 30 wt. percent of bromine, chlorine, or a mixture thereof, and component C is an alkyl phosphate ester that contains oxygen in the alkyl chain.

More particularly, the present invention is directed to a flame retardant compound comprising a flexible polyurethane foam. The invention includes component A, an alkyl substituted aryl phosphate represented by the general structure

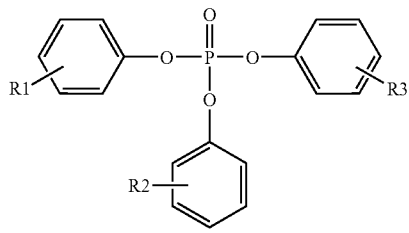

wherein $R_1$, $R_2$, and $R_3$ are independently either hydrogen or a linear or branched $C_1$ to $C_6$ alkyl group. Component B is a brominated flame retardant containing greater than 30 wt. percent of bromine. Component C is a flame retardant additives comprised of alkyl phosphate esters which the alkyl groups range from $C_4$ to $C_{20}$ and contains one to six oxygen atoms in the alkyl chain.

The invention includes a method for flame retarding flexible polyurethane foam wherein the flexible polyurethane foam is loaded with the flame retardant composition at levels desirable to meet the desired regulation.

DETAILED DESCRIPTION OF THE PREFERRED EMBODIMENTS

The invention relates to a flame retardant flexible polyurethane foam composition and a method of flame retarding flexible polyurethane foam. The composition comprises flammable flexible polyurethane foam and a multi-component flame retardant additive.

The multi-component flame retardant additive can be produced by the process of mixing component A, alkyl substituted aryl phosphates, optionally component B, a halogenated flame retardant containing more than 30 percent either bromine, chlorine, or a mixture thereof, and component C, an alkyl phosphate ester wherein the alkyl groups range from $C_4$ to $C_{20}$ and contain oxygen in the alkyl chain.

More particularly, component A is an alkyl substituted aryl phosphate represented by the general structure

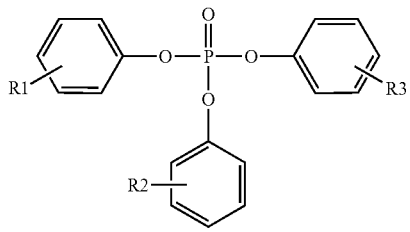

wherein each $R_1$, $R_2$, and $R_3$ is independently either hydrogen or a linear or branched $C_1$ to $C_6$ alkyl group. Preferred alkyl substituted aryl phosphates include t-butylated triphenyl phosphate, i-butylated triphenyl phosphate, tricresyl phosphate, isopropylated triphenyl phosphate, and mixtures thereof.

More preferably, component A materials are butylated triphenyl phosphates and isopropylated triphenyl including mixed triaryl phosphates in which the individual rings contain 0, 1, or 2 butyl or isopropyl groups. These alkylated triaryl phosphates contain from about 5.5 wt. percent to about 9 wt. percent phosphorus depending on the degree of alkylation.

The term "alkylation" as used for component A preferably includes a mixture of non-alkylated compound with mono- or di-alkylated compounds. Desirably, component A includes as much as 20 percent non-alkylated compound. The alkylated compounds can be a mixtures of approximately 30 or more isomers of mono- and/or di-alkylated compounds.

Component B flame retardant additives are comprised of halogenated flame retardants containing greater than 30 wt. percent of either bromine or chlorine, or combinations thereof. Preferred component B flame retardant additives are brominated flame retardants containing greater than 30 wt. percent of bromine. Compounds having less than about 30 wt. percent bromine may also be useful, but it is believed that excessively high amounts of such compounds would be needed to provide the necessary level of flame retardancy. The high levels of flame retardant have a detrimental effect on the physical properties of the resulting foams. Suitable bromine containing flame retardants include compounds containing various halogenated alkyl, aryl, or alkyl aryl groups as long as the size of the groups does not dilute the halogen content below about 30 wt. percent. Component B may be monomeric, dimeric, or oligomeric.

Preferable component B additives include brominated alkylated aromatics, aromatic ethers, benzoates, and phthalates. These are represented by the general structures

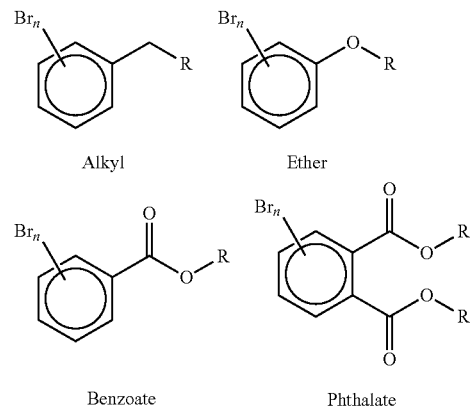

wherein n is an integer from 1 to 5 for alkylated aromatics, ethers and benzoates and from 1 to 4 for phthalates. R is also a hydrocarbyl group that can optionally contain nitrogen, oxygen, and/or sulphur atoms. The hydrocarbyl group can contain multiple nitrogen, oxygen, or sulphur atoms. The benzoates and phthalates can optionally be blended together.

As employed herein, the term "hydrocarbyl" includes hydrocarbon as well as substantially hydrocarbon groups. "Substantially hydrocarbon" describes groups that contain heteroatom substituents that do not alter the predominantly hydrocarbon nature of the group or significantly diminish the effectiveness of the compound as a stabilizer for polymeric resins.

Examples of hydrocarbyl groups include the following:

(1) hydrocarbon substituents, i.e., aliphatic (e.g., alkyl or alkenyl), alicyclic (e.g., cycloalkyl, cycloalkenyl) substituents, aromatic-, aliphatic-, and alicyclic-substituted aliphatic substituents, aromatic substituents, aromatic-, aliphatic-, and alicyclic-substituted aromatic substituents, and the like, as well as cyclic substituents wherein the ring is completed through another portion of the molecule (that is, for example, any two indicated substituents may together form an alicyclic radical);

(2) substituted hydrocarbon substituents, i.e., those substituents containing non-hydrocarbon groups which, in the context of the present invention, do not alter the predominantly hydrocarbon nature of the substituent; those skilled in the art will be aware of such groups (e.g., halo, hydroxy, mercapto, nitro, nitroso, sulfoxy, etc.);

(3) heteroatom substituents, i.e., substituents that will, while having a predominantly hydrocarbon character within the context of the present invention, contain an atom other than carbon present in a ring or chain otherwise composed of carbon atoms (e.g., alkoxy or alkylthio). Suitable heteroatoms will be apparent to those of ordinary skill in the art and include, for example, sulfur, oxygen, nitrogen, and such substituents as, e.g., pyridyl, furyl, thienyl, imidazolyl, etc. Preferably, no more than about two, more preferably no more than one, hetero substituent will be present for every ten carbon atoms in the hydrocarbyl group. Most preferably, there will be no such heteroatom substituents in the hydrocarbyl group, i.e., the hydrocarbyl group is purely hydrocarbon.

Component C consists of the flame retardant additives that are comprised of an alkyl phosphate ester wherein the alkyl groups range from $C_4$ to $C_{20}$ and contain oxygen atoms in the alkyl chain. The oxygen atoms in the chain range from one to six. Preferably, one or two oxygen atoms are present in the chain. The alkyl groups can optionally be heterocycles containing oxygen.

Preferred alkyl phosphate esters are represented by the following structures.

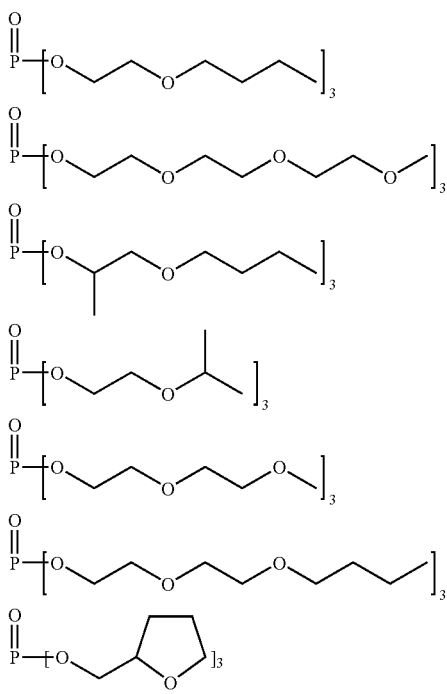

Components A and B are used in ratios determined to provide the best balance of properties. The ratios of component A and component B are typically from about all component A to about 5:95 weight percent, preferably from about 70:30 to about 30:70 weight percent. Most preferably the ratio is about 50 weight percent of the butylated triphenyl phosphates and about 50 weight percent of the brominated benzoate or phthalate.

The combination of components A, B, and C may be done separately such that the A, B and C are provided as a single flame retardant package, or the individual components can be added individually to the other urethane reactants. Component C is added as a percentage of the component A and B blend. The ratios of components A and B to component C are typically from about 75:25 to about 99:1 weight percent, preferably from about 85:15 to about 99:1. When used as a pre-combined package, the A+B+C blend is typically used in an amount of from about 5 to about 25 parts per hundred polyol based on the polyol used in the formulation.

Unexpectedly, foams containing blends of components A and C wherein component A was a butylated triaryl phosphate and component C was tris(butoxyethyl)phosphate or blends containing components A, B and C wherein component A was a butylated triaryl phosphate, component B was a tetrabromobenzoate ester and component C was tris(butoxyethyl) phosphate were as much as four to five parts per hundred polyol more efficient than blends containing only components A and B. One would not expect that a blend of components A, B, and C which has a lower halogen content to be as efficient as or more efficient than a comparable blend of components A and B. Similarly, one would not expect that a blend of components A and C which has a similar but lower phosphorus content to component A only to be more efficient than component A alone.

It was observed that in blends of components A, B, and C, or in blends of components A and C wherein component C contained more than one oxygen in the alkyl chain an increase in flame retardant efficiency was greater than when only one oxygen atom was present.

The compounds of this invention can be used with other additives that are desirable for use in preparing a final polymer composition. These other additives can include fillers, reinforcing agents such as glass fiber, pigments, processing aids, stabilizers including hydrotalcite, flow enhancers, flame-retardant aids, and synergists such as antimony compounds and zinc borate, zinc stannate, zinc sulfide, and others known by one experienced in the art.

The invention can be used in other resins requiring flame retardant qualities. Other resins requiring flame retardant qualities include polyesters such as polybutylene terephthalate (PBT), or polyethylene terephthalate (PET), polyamides, polycarbonates, polyurethanes, polystyrenes, and polyolefins, epoxy or alloys and blends of these resins.

EXAMPLES

Laboratory flexible polyurethane foams were prepared by a hand mix method known in the art using the formulations listed in Table 1 below. The polyurethane foam formulations were prepared for three final foam densities of 1.2, 1.5, and 1.8 pounds per cubic foot. The flame retardants, and their respective load levels, added to the polyurethane foams are shown in Tables 2 and 3.

Each of the flame retardants in Tables 2 and 3 was added to the polyurethane foam formulations of Table 1 for each of the different foam densities. The flame retardant load levels listed in Tables 2 and 3 are the minimum for that respective flame retardant at the listed foam density for the standard tests known as California's Bulletin 117 or the United States Department of Transportations Federal Motor Vehicle Safety Standards 302.

Table 1 illustrates formulations for polyurethane foam for three desired densities of 1.2 p.c.f., 1.5 p.c.f., and 1.8 p.c.f. All components are expressed in parts by weight.

TABLE 1

| Polyurethane Foam Formulations | | | |
|---|---|---|---|
| | 1.2 pcf | 1.5 pcf | 1.8 pcf |
| Polyether Polyol (56.6 OH index) | 100 | 100 | 100 |
| Water | 6.2 | 4.4 | 3.3 |
| Flame Retardant | See below | See below | See below |
| Amine Catalyst | 0.48 | 0.5 | 0.5 |
| Silicone Surfactant | 1 | 1 | 1 |
| Tin Catalyst | 0.26 | 0.26 | 0.26 |
| TDI | 75.9 | 56.7 | 45.1 |

The load level of flame retardant added to the polyurethane foam formulations of Table 1 is dependent on the desired application of the foam and density of the foam. Table 2 shows the minimum flame retardant load levels in polyurethane foam acceptable to pass California's flammability criteria in the form of its Bulletin 117. California's Bulletin 117 requires the flame retardant polyurethane foam pass both an open flame test and a smoldering test.

Table 3 shows the minimum flame retardant load levels in polyurethane foam to pass the U.S. Federal Motor Vehicle Safety Standards 302.

California Bulletin 117 Test

California's Bulletin 117 open flame test is used to determine the resistance of resilient cellular materials to flame and glow propagation and tendency to char. The test uses rectangular samples of flame retardant polyurethane foam of the dimensions 12 inches long by 3 inches wide by ½ inch deep.

The samples must be tested and conditioned for a minimum of 24 hours, at 70±5° F. and less than 55 percent relative humidity. The samples and the holder are suspended vertically with the bottom edge of the sample 0.75 inches above the top burner. The burner flame is adjusted by means of a needle valve in the base of the burner to give a flame height of 1.5 inches with air supply to the burner permanently shut off. The burner flame is applied vertically at the middle of the lower edge of the sample for 12 seconds.

The char length of the sample is measured to the nearest 0.1 inches and the afterflame time and afterglow time to the nearest 0.1 seconds. Maximum and average char length, afterglow, and afterflame are determined for the cellular material. Afterflame time is the time the sample continues to flame after the burner flame is extinguished, including the afterflame of molten drops of material. Afterglow time is the time the sample continues to glow after it has ceased to flame, including the afterglow of molten drops of material. Char length is the distance from the end of the sample exposed to the flame to the upper edge of the void area. Readily removable regions of carbonaceous char shall be removed prior to measurement.

To pass the open flame test, the average char length of the flame retardant polyurethane foam samples must not exceed six inches and the maximum char length of any individual sample must not exceed eight inches. The average afterflame, including that of the molten material, must not exceed five seconds and the maximum afterflame of any individual sample must not exceed 10 seconds. The average afterglow, including that of the molten material, must not exceed 15 seconds.

The flame retardant polyurethane foam must also pass the smoldering screening test. The test requires natural tobacco cigarettes without filters and a test fabric of flammable cotton or cotton/polyester blend bed sheeting to cover the cigarettes.

The cigarette is lit with no more than a four-millimeter burn and covered with the sheeting material. The test is run until all evidence of combustion has ceased for a minimum of five minutes. All carbonaceous char is cleaned from panels by scraping with a spatula and the non-burned portions of the foam test panels are weighed to the nearest 0.1 gram. If all of the test specimens possess greater than 80 percent of non-smoldered residue, then the flame-resistant polyurethane foam sample passes the smolder test.

The flame retardants listed in Table 2 were individually added to the formulation for the desired polyurethane foam density of Table 1 and tested pursuant to California's Bulletin 117 criteria detailed above. The values of flame retardant listed in Table 2 (measured in part per hundred polyol) represent the minimum load level of the flame retardant required for the formulation, as represented in Table 1, to meet California's Bulletin 117 test criteria.

TABLE 2

Minimum Loading to Pass California's Bulletin 117 Requirements

| Flame Retardant (part per hundred polyol) | Density | | |
|---|---|---|---|
| | 1.2 pcf | 1.5 pcf | 1.8 pcf |
| Comparative Example A<br>Component A (50%) butylated triaryl phosphate ester<br>Component B (50%) tetrabromobenzoate ester | 20 | 14 | 9 |
| Example 1<br>Component A (42.5%) butylated triaryl phosphate ester<br>Component B (42.5%) tetrabromobenzoate ester<br>Component C (15%) tributoxyethyl phosphate | 16 | 11 | 6 |
| Comparative Example B<br>Component A (60%) isopropylated triaryl phosphate ester<br>Component B (40%) tetrabromophthalate ester | 22 | 15 | 9 |
| Example 2<br>Component A (34%) isopropylated triaryl phosphate ester<br>Component B (51%) tetrabromophthalate ester and<br>Component C (15%) tributoxyethyl phosphate | Not Tested | 15 | Not Tested |
| Comparative Example C<br>Component A (50%) isopropylated triaryl phosphate ester<br>Component B (50%) tetrabromophthalate ester | 24 | 15 | 9 |
| Example 3<br>Component A (42.5%) isopropylated triaryl phosphate ester<br>Component B (42.5%) tetrabromophthalate ester<br>Component C (15%) tributoxyethyl phosphate | Not Tested | 15 | Not Tested |
| Comparative Example D<br>Component A butylated triaryl phosphate ester | 37 | 23 | 16 |
| Example 4<br>Component A (90%) butylated triaryl phosphate ester<br>Component C (10%) tributoxyethyl phosphate | 27 | 19 | 12 |

The results presented in Table 2 demonstrate that a blend of components A+B+C has an equal or greater efficiency in retarding a flame when compared to a foam composition made with a higher amount of halogen content using only components A and B. Surprisingly, as Table 2 shows, the polyurethane foams that contained blends of components A and C wherein component A was a butylated triaryl phosphate and component C was tris(butoxyethyl)phosphate or blends containing components A, B, and C wherein component A was a butylated triaryl phosphate, component B was a tetrabromobenzoate ester and component C was tri(butoxyethyl)phosphate were four to five parts per hundred polyol more efficient than blends containing only component A or components A and B, respectively.

For example, for the polyurethane foam formulation to pass California's Bulletin 117 using the flame retardant compound comprising the general formula of component B (50 percent) tetrabromobenzoate ester and component A (50 percent) butylated triaryl phosphate ester, a 20 php load level was required for a 1.2 p.c.f. polyurethane foam, a 14 php load level was required for a 1.5 p.c.f. polyurethane foam, and a 9 php load level was required for a 1.8 p.c.f. polyurethane foam. However, using the flame retardant compound comprising the general formula component B (42.5 percent) tetrabromobenzoate ester and component A (42.5 percent) butylated triaryl phosphate ester and (15 percent) tributoxyethyl phosphate, only a 16 php load level was required for a 1.2 p.c.f. polyurethane foam, a 11 php load level was required for a 1.5 p.c.f. polyurethane foam, and a 6 php load level was required for a 1.8 p.c.f. polyurethane foam. The efficiency was increased by the addition of component C.

This result is unexpected for several reasons. It is unexpected that components A, B, and C, which have a lower halogen content than a comparable blend of components A and B, to be more efficient to a comparable blend of components A and B alone. Further, it is unexpected that components A and C, which have a lesser but similar phosphorus content to A only, to be more efficient than component A alone.

Motor Vehicle Safety Standards 302

Table 3 shows the minimum flame retardant load levels in polyurethane foam acceptable to pass the United States Department of Transportation Federal Motor Vehicle Safety Standards 302 (MVSS-302) criteria. The Motor Vehicle Safety Standards 302 requires the flame retardant polyurethane foam pass a horizontal burn rate test after exposure to a small flame.

The Motor Vehicle Safety Standards 302 horizontal burn rate test measures the burn rate or the quotient of the burnt distance measured and the time taken to burn that distance, expressed in millimeter per minute. The MVSS-302 horizontal burn test requires the polyurethane foam may not burn or transmit a flame front across its surface at a rate or more than 102 mm/min. If the material stops burning before it has burned for 60 seconds from the start of timing and has not burned more than 51 mm from the point where the timing started, it is considered to meet the burn-rate requirement.

The MVSS-302 horizontal burn test is conducted in a metal cabinet to protect the test samples from drafts. There is a hole to permit the tubing of the Bunsen burner and for ventilation.

Prior to testing the samples are conditioned for 24 hours at 21° C., relative humidity 50 percent. Each sample is. The thickness is that of the single or composite material used in the vehicle. The test sample is inserted between to matching U-shaped frames of metal stock. The flame of the Bunsen burner is set, and the air inlet to the burner is closed. The sample is placed in the cabinet in a horizontal position. The Bunsen burner is positioned so that the center of the burner tip is below the center of the bottom edge of the open end of the sample. The sample is exposed to the flame for 15 seconds. Timing is commenced when the flame from the burning sample reaches a point 38 mm from the open end of the sample. The time it takes for the flame to progress to a point 38 mm from the clamped end of the sample is measured. If the flame does not reach the specified end point, the time the flames progress to the point where the flaming stops is timed. The burn rate is calculated by the formula:

Burn Rate=60×(Distance/Time)

Table 3 shows the minimum flame retardant loading levels in polyurethane foam required to pass the United States Department of Transportation Federal Motor Vehicle Safety Standards flammability testing.

TABLE 3

Minimum Loading to Pass the Motor Vehicle Safety Standards 302

| Flame Retardant | Density | | |
|---|---|---|---|
| | 1.2 pcf | 1.5 pcf | 1.8 pcf |
| Comparative Example E<br>Component A (50%)<br>butylated triaryl phosphate ester<br>Component B (50%)<br>tetrabromobenzoate ester | 23 | 14 | 4 |
| Example 5<br>Component A (42.5%)<br>butylated triaryl phosphate ester<br>Component B (42.5%)<br>tetrabromobenzoate ester<br>Component C (15%)<br>tributoxyethyl phosphate | 19 | 12 | 3.5 |
| Comparative Example F<br>Component A (60%)<br>isopropylated triaryl phosphate ester<br>Component B (40%)<br>tetrabromophthalate ester | 23 | 15 | 4 |
| Example 6<br>Component A (51%)<br>isopropylated triaryl phosphate ester<br>Component B (34%)<br>tetrabromophthalate ester<br>Component C (15%)<br>tributoxyethyl phosphate | Not Tested | 15 | Not Tested |
| Comparative Example G<br>Component A (50%)<br>isopropylated triaryl phosphate ester<br>Component B (50%)<br>tetrabromophthalate ester | 27 | 14 | 4 |
| Example 7<br>Component A (42.5%)<br>isopropylated triaryl phosphate ester and<br>Component B (42.5%)<br>tetrabromophthalate ester and<br>Component C (15%)<br>tributoxyethyl phosphate | Not Tested | 15 | Not Tested |
| Comparative Example H<br>Component A<br>butylated triaryl phosphate ester | 28 | 17 | 7 |
| Example 8<br>Component A (90%)<br>butylated triaryl phosphate ester<br>Component C (10%)<br>tributoxyethyl phosphate | 22 | 12 | 3.5 |

The results presented in Table 3 demonstrate that a blend of components A+B+C has a comparable or greater efficiency in retarding a flame when compared to a foam composition made with a higher amount of halogen content using only components A and B. Surprisingly, as Table 3 shows, the polyurethane foams that contained blends of components A and C wherein component A was a butylated triaryl phosphate and component C was tris(butoxyethyl)phosphate or blends containing components A, B, and C wherein component A was a butylated triaryl phosphate, component B was a tetrabromobenzoate ester, and component C was tri(butoxyethyl) phosphate were as much as four to five parts per hundred polyol more efficient than blends containing only components A and B alone.

For example, for the polyurethane foam formulation to pass the Department of Transportation Federal Motor Vehicle Safety Standards 302 using the flame retardant compound comprising the general formula of component B (50 percent) tetrabromobenzoate ester and component A (50 percent) butylated triaryl phosphate ester, a 23 php load level was required for a 1.2 p.c.f. polyurethane foam, a 14 php load level was required for a 1.5 p.c.f. polyurethane foam, and a 4 php load level was required for a 1.8 p.c.f. polyurethane foam. However, using the flame retardant compound comprising the general formula component B (42.5 percent) tetrabromobenzoate ester and component A (42.5 percent) butylated triaryl phosphate ester and (15 percent) tributoxyethyl phosphate, only a 19 php load level was required for a 1.2 p.c.f. polyurethane foam, a 12 php load level was required for a 1.5 p.c.f. polyurethane foam, and a 3.5 php load level was required for a 1.8 p.c.f. polyurethane foam. The efficiency was increased by the addition of the component C.

This result is unexpected for several reasons. It is unexpected that components A, B, and C, which have a lower halogen content than a comparable blend of components A and B, to be more efficient to a comparable blend of components A and B alone. Further, it is unexpected that components A and C, which have similar phosphorus content to A only, to be more efficient than component A alone.

We claim:

1. A flame retardant composition for use with a flexible polyurethane foam comprising:
    a component A, said component A being an alkyl substituted aryl phosphate represented by the general structure

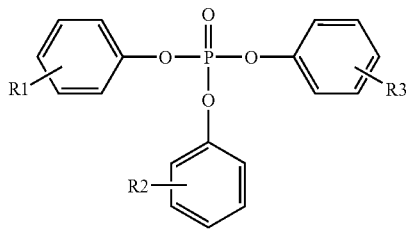

wherein $R_1$, $R_2$, and $R_3$ are independently either hydrogen or a linear or branched $C_1$ to $C_6$ alkyl group;
    a component B, said component B includes halogenated flame retardants selected from the group consisting of brominated alkylated aromatics, brominated aromatic ethers, brominated benzoates, and brominated phthalates represented by the general structures

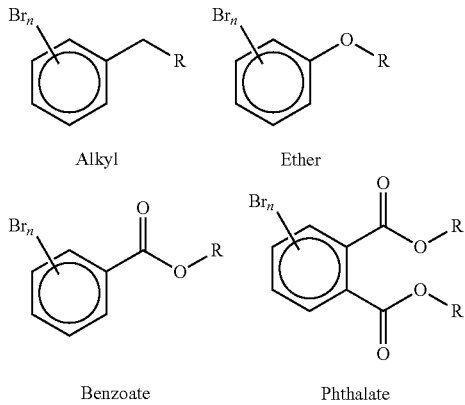

and mixtures thereof, wherein n is an integer from 1 to 5 for alkylated aromatics, ethers, and benzoates and from 1 to 4 for phthalates, R is an alkyl group which optionally comprises at least one nitrogen, oxygen, or sulphur atom; and a component C, said component C includes a flame retardant additive comprising an alkyl phosphate ester having alkyl groups range from $C_4$ to $C_{20}$ and contain one to six oxygen atoms in the alkyl chain,
    wherein said component A and said component B are present in a ratio with component C from about 85:15 to about 99:1 wt. percent.

2. The composition of claim 1 wherein said alkyl substituted aryl phosphate is a member selected from the group consisting of t-butylated triphenyl phosphate, i-butylated triphenyl phosphate, tricresyl phosphate, isopropylated triphenyl phosphate, and mixtures thereof.

3. The composition of claim 1 wherein said alkyl substituted aryl phosphate is butylated triphenyl phosphate including triaryl phosphates with individual rings containing 0, 1, or 2 butyl groups, said alkylated triaryl phosphates contain between 5.5 to 9 wt. percent phosphorus.

4. The composition of claim 1 wherein said alkyl substituted aryl phosphate is isopropylated triphenyl phosphate including triaryl phosphates with individual rings containing 0, 1, or 2 isopropyl groups, said alkylated triaryl phosphates contain between 5.5 to 9 wt. percent phosphorus.

5. The composition of claim 1 wherein said alkyl phosphate ester is a heterocycle containing oxygen.

6. The composition of claim 1 wherein the alkyl groups of said alkyl phosphate ester range from $C_4$ to $C_{20}$ and contain one to six oxygen atoms in the alkyl chain represented by the following formulas:

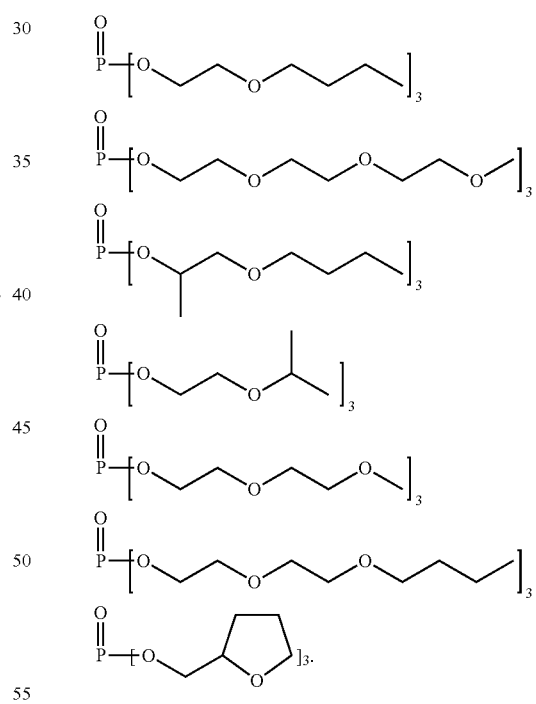

7. The composition of claim 1 wherein said alkyl phosphate ester is tris(butoxyethyl)phosphate.

8. The composition of claim 1 wherein said component A and said component B are present in a ratio of about 99:1 to about 5:95 wt. percent of component A to component B.

9. The composition of claim 8 wherein said component A and said component B are present in a ratio from about 70:30 to about 30:70 wt. percent.

10. The composition of claim 9 wherein said component A and said component B are present in a ratio from about 50:50 wt. percent.

11. A flame retardant composition for use with a flexible polyurethane foam comprising:
    a component A, said component A is an alkyl substituted aryl phosphate selected from the group consisting of butylated triphenyl phosphates and isopropylated triphenyl phosphates;
    a component B, said component B includes brominated flame retardants selected from the group consisting of brominated alkylated aromatics, brominated aromatic ethers, brominated benzoates, and brominated phthalates represented by the general structures

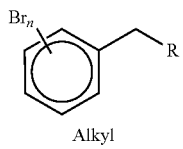
Alkyl

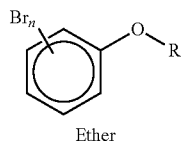
Ether

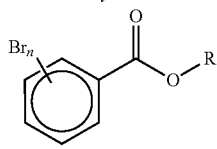
Benzoate

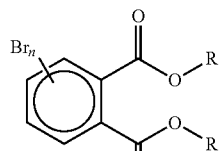
Phthalate and mixtures thereof, wherein n is an integer from 1 to 5 for alkylated aromatics, ethers, and benzoates and from 1 to 4 for phthalates, R is an alkyl group which optionally comprises at least one nitrogen, oxygen, or sulphur atom; and
    a component C, said component C includes a flame retardant additive comprising an alkyl phosphate ester wherein the alkyl groups range from $C_4$ to $C_{20}$ and contain one to six oxygen atoms in the alkyl chain represented by the following formulas

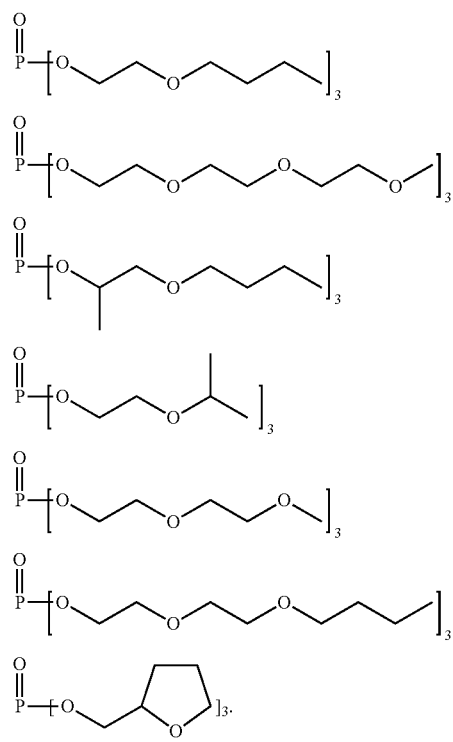

wherein said component A and said component B are present in a ratio with component C from about 85:15 to about 99:1 wt. percent.

* * * * *